United States Patent
Ohmi et al.

[11] Patent Number: 6,039,814
[45] Date of Patent: Mar. 21, 2000

[54] CLEANING METHOD UTILIZING DEGASSED CLEANING LIQUID WITH APPLIED ULTRASONICS

[75] Inventors: Tadahiro Ohmi, Miyagi-ken; Takahisa Nitta, Tokyo, both of Japan

[73] Assignees: Tadahiro Ohmi, Miyagi; Kabushiki Kaiha Ultraclean Technology Research Institute, Tokyo, both of Japan

[21] Appl. No.: 08/887,883

[22] Filed: Jul. 3, 1997

[30]     Foreign Application Priority Data

Jul. 4, 1996 [JP] Japan .................................. 8-175297

[51] Int. Cl.[7] ........................................................ B08B 3/12
[52] U.S. Cl. .................................. 134/1; 134/21; 134/184
[58] Field of Search .................................. 134/1, 21, 184

[56]             References Cited

U.S. PATENT DOCUMENTS

| | | | |
|---|---|---|---|
| 2,977,962 | 4/1961 | Zucker | 134/111 |
| 4,193,818 | 3/1980 | Young et al. | 134/1 |
| 4,854,337 | 8/1989 | Bunkenburg et al. | 134/1 |
| 4,907,611 | 3/1990 | Shibano | 134/184 |
| 5,427,622 | 6/1995 | Stanasolovich et al. | 134/1 |
| 5,447,171 | 9/1995 | Shibano | 134/184 |
| 5,656,097 | 8/1997 | Olesen et al. | 134/1 |

*Primary Examiner*—Randy Gulakowski
*Assistant Examiner*—Saeed Chaudhry
*Attorney, Agent, or Firm*—Randall J. Knuth

[57]             ABSTRACT

A cleaning method comprising the steps of degassing gas dissolved in a cleaning liquid therefrom to a value not more than 5 ppm, loading ultrasonics with a frequency of 1 MHz or more to the cleaning liquid, and cleaning an object for cleaning with the cleaning liquid. Also included, is a cleaning method comprising the steps of: degassing gas dissolved in a surface-active agent-containing cleaning liquid therefrom to a value not more than 5 ppm, loading ultrasonics with a frequency of 1 MHz or more to the cleaning liquid, and cleaning an object for cleaning with the cleaning liquid. Water vapor may be used to sweep gas from a degassing device.

4 Claims, 9 Drawing Sheets

(a)

(b)

(a)

(b)

(a)

(b)

(a) normalization of molecular weight (b) normalization of molecular weight (a) normalization of molecular weight (b) normalization of molecular weight (a)

(b)

(c)

CLEANING METHOD UTILIZING DEGASSED CLEANING LIQUID WITH APPLIED ULTRASONICS

TECHNOLOGICAL FIELD

The present invention relates to a precision cleaning method which can preferably be applied to an operation for cleaning, for instance, a silicon substrate and a liquid crystal substrate or the like.

BACKGROUND TECHNOLOGY

In recent years, there have been employed a cleaning method and a cleaning apparatus, to which ultrasonics of less than 1 MHz (e.g. 500 kHz), so-called the megasonics is applied, for precision cleaning of a silicon substrate and a liquid crystal substrate. That is because, when megasonics is employed, particulate (especially, particulate 0.2 $\mu$m or less) on a substrate can effectively be removed by cleaning with a low-density cleaning liquid (chemical liquid) under the room temperature.

However, a frequency of ultrasonics effects to cleaning efficiency and damage to the substrate itself. It is known that, when ultrasonics of 500 kHz or less is used for precision cleaning, for example, a substrate with a pattern such as a wiring pattern thereon is easily damaged due to the phenomenon of erosion by the ultrasonics.

On the other hand, it is generally recognized that a higher frequency gives less damage to a substrate, and that cleaning effects to a minute spot thereon and uniformity of cleaning over the entire substrate are improved.

With the current state of the art, therefore, a frequency of around 500 kHz is used to be brought into balance among effective removal of particulate from a substrate, prevention of damage to the substrate, and uniformity in the cleaning.

It is desired, however, that megasonics with a much higher frequency is used to satisfy the needs for improvements in making a pattern finer (for a distance between each wiring of 0.5 $\mu$m or less) and in cleaning uniformity over a substrate having a large area (e.g. an 8-inch wafer).

There is still remaining the problem that removal efficiency of particulate is not sufficient in an area of a frequency exceeding 1 MHz. Also, it is found that, when cleaning is performed actually using ultrasonics with a frequency of 1 MHz or more, uniformity in cleaning is not always improved and lack of uniformity in cleaning occurs, and in addition some flaws are made on the surface of the pattern due to an uncertain cause.

It is an object of the present invention to provide a cleaning method which is excellent in removal efficiency of minute particles and can clean a substrate even with a large area with excellent uniformity in cleaning the substrate without giving any damage to the substrate.

DISCLOSURE OF THE INVENTION

A cleaning method according to the present invention comprises the steps of degassing gas dissolved in a cleaning liquid therefrom to a value not more than 5 ppm, loading ultrasonics with a frequency of 1 MHz or more to the cleaning liquid, and cleaning an object for cleaning with the cleaning liquid.

Especially, it is preferable that all quantity of gas dissolved therein is set to 3 ppm and a frequency of 2 MHz or more is used.

Also, a cleaning method according to the present invention comprises the steps of degassing gas dissolved in a surface-active agent-containing cleaning liquid therefrom to a value not more than 5 ppm, loading ultrasonics with a frequency of 1 MHz or more to the cleaning liquid, and cleaning an object for cleaning with the cleaning liquid.

Especially, it is preferable that all quantity of gas dissolved therein is set to 3 ppm and a frequency of 2 MHz or more is used.

FUNCTION

Description is made hereinafter for function of the invention with some knowledge obtained when the present invention has been made.

(Claim 1)

The inventor of the present invention has made great effort to study causes, generated in a case where a frequency of 1 MHz or more is used, for decrease in the removal efficiency of particulate as well as for generating lack of uniformity in cleaning.

It is found that a large amount of minute bubbles which have never been experienced occur in a liquid irradiated with megasonics and easily float in the liquid. When megasonics with a frequency of 1 MHz or more is used, for example, occurrence of bubbles is remarkable, which is hardly seen when ultrasonics with a frequency of 500 kHz is used, in a liquid (an indirect liquid) filling a space between an internal vessel (a cleaning vessel) and an external vessel in a case where cleaning is performed in a cleaning liquid and in the two-vessel system shown in FIG. 5. Minute bubbles generated in the liquid in the floating state floats for a long period of time and then are adhered on the surface of an ultrasonic vibrating plate and on the whole bottom surface of the bottom plate of the internal vessel, whereby the propagation of a sound wave is extremely damaged. The bubbles are also adhered on the surface of a substrate as an object for cleaning, which causes cleaning lack of uniformity to be generated, and further causes flaws in a size of around 1.5 times as large as a diameter of a bubble to be made on a product. These are guessed as causes for reducing the efficiency of removing particulate as well as for generating lack of uniformity in cleaning.

For this reason, examination has been made on a source for generation of bubbles when high-frequency ultrasonics is irradiated thereonto, and as a result, it has been determined that the source is gas dissolved in the liquid. It has been found through this study that the problems can be resolved by reducing not only dissolved oxygen but also all dissolved gas elements from the liquid to be irradiated with megasonics.

It is the most important point for realizing the present invention that gas dissolved in the liquid irradiated with megasonics is removed therefrom to a specified level or less whatever type the gas may be. Namely, only deoxidation using a catalyst resin or nitrogen gas, which has conventionally been carried out, is insufficient for this purpose. A depressurizing and degassing system performed near a use point is the most preferable way for obtaining a liquid from which all the gas is removed.

In an one-vessel type of cleaning with megasonics, a cleaning liquid is degassed by a degassing film and supplied to the vessel, and the cleaning liquid is irradiated with megasonics. In some cases, a cleaning liquid degassed to a target density or less may be prepared in the vessel by highly degassing only ultrapure water for diluting chemical and mixing the water with a small amount of chemical liquid at a specified ratio. In a case of two-vessel system in which an indirect liquid for preventing rising of temperature in the cleaning liquid and the cleaning liquid are separated from each other and used independently from each other, the cleaning liquid in the internal vessel and the indirect liquid (ultrapure water is generally used) in the external vessel are discretely degassed and supplied. When the cleaning liquid is overflown from the internal vessel and supplied to the indirect vessel in the two-vessel system, only the cleaning liquid may be degassed.

The present invention is easily applicable also to cleaning of substrates in an one-by-one system using a nozzle or a slit having a megasonic vibrator. In this case, the cleaning liquid is degassed and supplied to the nozzle or the slit and then is jetted therefrom while it is irradiated with megasonics to be poured onto a substrate or the like as an object for cleaning. (Claim 2)

There has been used high temperature cleaning, which has been called as RCA cleaning, using a hydrogen peroxide-based chemical liquid for wet cleaning of a semiconductor substrate. Recently, a new cleaning method (UCT cleaning method) comprising steps, all of which are performed under room temperature, has been announced and attention is focused thereon as a method of reducing a quantity of chemicals as well as a quantity of ultrapure water for rinsing to be used after cleaning and improving the throughput. A key point of the new cleaning method is to use ozone-added ultrapure water, to irradiate the water with ultrasonics in a megahelz band which is called megasonics, and to apply a surface active-agent thereto. It is recognized that the surface active-agent among them used mainly for preventing particulate from being deposited onto the substrate is gradually decomposed by being irradiated with megasonics. But, in a case where the above cleaning method is applied to a batch type of cleaning method based on the conventional technology, it has been desired to develop a method of preventing decomposition of the surface-active agent for the purpose of using stably and repeatedly a chemical liquid over a plurality of times.

A study was made on decomposition of organic substances due to irradiation of megasonics thereto, and as a result, it was determined that generation of radicals had something to do with the decomposing reaction. Namely, it was confirmed from a result of experiments and many other references that radicals derived from water, generally called OH-radical and H-radical, which were chemically quite active were generated when megasonics were irradiated onto ultrapure water or a chemical liquid for cleaning a substrate, and that those radicals helped decomposition of links between molecules of organic substances. A study was further made on conditions of generating radicals, and it was found that the generation could remarkably be suppressed when gas (not only the dissolved oxygen) dissolved in the ultrapure water or the chemical liquid was completely removed therefrom. For this reason, it is assumed that complete removal of dissolved gas from the liquid, used after a surface-active agent as organic substances is dissolved thereinto before the liquid is irradiated with megasonics, helps prevention of the surface-active agent from decomposition.

A chemical liquid using a surface-active agent includes, for instance, ultrapure water, hydrofluoric acid, hydrogen peroxide, or a mixture thereof. So-called a depressurizing film-degassing system with a module mounting thereon a film having stability to those chemicals, is useful for removal of dissolved gas from one of those chemical liquids, and detailed description is made hereinafter for the system.

It should be noted that two methods described below are conceivable when the removal of dissolved gas is executed by applying the depressurizing film-degassing system thereto, and either one of the two methods may be selected as required.

(1) A method of degassing a mixed chemical liquid obtained by dissolving hydrofluoric acid, hydrogen peroxide, and a surface-active agent into ultrapure water down to a specified level.

(2) A method of using a high-density chemical liquid (hydrofluoric acid, hydrogen peroxide, and a surface-active agent) by adding the liquid into the sufficiently degassed ultrapure water little by little to adjust the density to a specified density.

BRIEF DESCRIPTION OF THE DRAWINGS

FIG. 7 is graphs each showing the molecular weight distribution of a surface-active agent after cleaning is carried out with a cleaning liquid without being degassed; wherein FIG. 7a shows the molecular weight distribution after 2 hours of megasonic irradiation and FIG. 7b shows the molecular weight distribution after 4 hours of irradiation.

FIG. 8 is graphs each showing the molecular weight distribution of a surface-active agent after cleaning is carried out with a cleaning liquid degassed as far as 5 ppm; wherein FIG. 8a shows the molecular weight distribution is shown after 2 hours of megasonic irradiation and FIG. 8b, after 4 hours of megasonic irradiation.

FIG. 9 is graphs each showing the molecular weight distribution of a surface-active agent after cleaning is carried out with a cleaning liquid degassed as far as 1 ppm; wherein FIG. 9a shows the molecular weight distribution after 2 hours of megasonic irradiation and FIG. 9b, after 4 hours of megasonic irradiation and.

FIG. 10 is concept diagrams each showing one example of a degassing device wherein FIG. 10a depicts a degassing device utilizing a vacuum, FIG. 10b depicts a degassing device showing the direction of gas swept, and FIG. 10c depicts a degassing device showing the direction of gas swept and a vacuum.

(Description of the Reference Numerals)

| | |
|---|---|
| 1 | Pump for circulation |
| 2 | Filter |
| 3 | Degassing device |
| 4 | Cleaning vessel |
| 5 | Degassing device |
| 6 | Vacuum pump |

-continued

| 7 | Filter |
| 8 | Pump for circulation |
| 9 | Vibrator |
| 10 | High-frequency power supply unit |

BEST MODE FOR CARRYING OUT THE INVENTION (Cleaning Apparatus)

Figure 4:
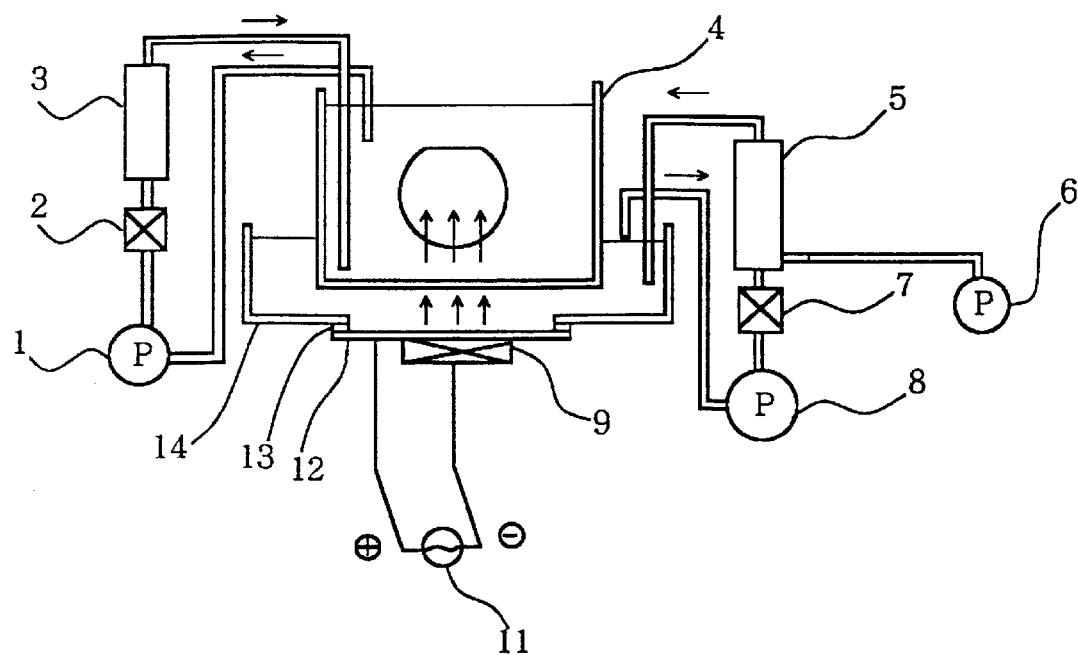
FIG. 4 is a concept diagram showing one example of a two-vessel type of cleaning apparatus.
Figure 5:
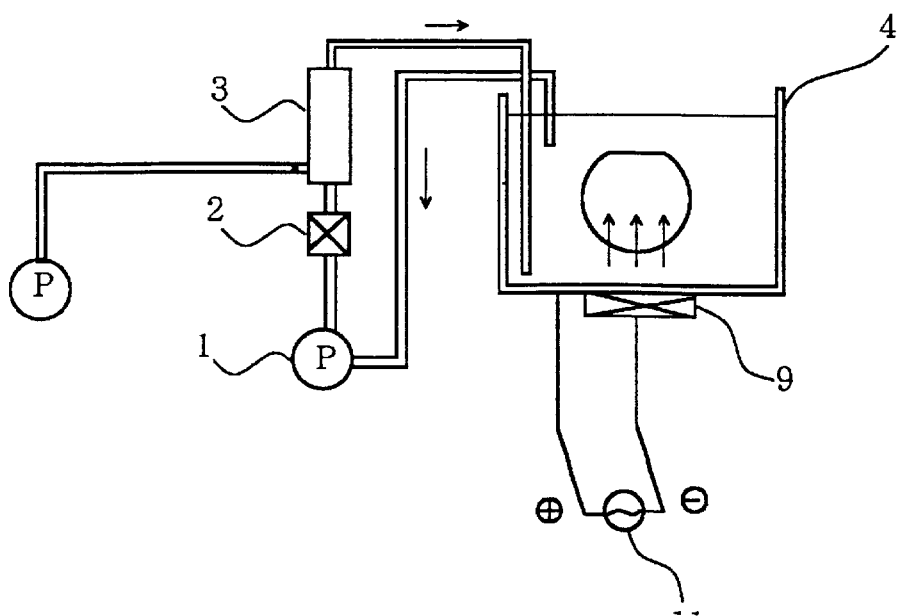
FIG. 5 is a concept diagram showing one example of an one-vessel type of cleaning apparatus.

For example, either one of the apparatuses shown in FIG. 4 and FIG. 5 may be used for carrying out the present invention.

FIG. 4 shows a two-vessel type of cleaning apparatus, and FIG. 5 shows an one-vessel type of cleaning apparatus.

In FIG. 4, the reference numeral 4 indicates a cleaning vessel made of, for instance, quartz, an indirect vessel 14 is provided outside of the cleaning vessel, and the bottom face of the indirect vessel 14 is formed by a diaphragm 12. Attached to the bottom face of the diaphragm 12 is a vibrator 9 with an adhesive. The vibrator 9 vibrates upon input of power from the high-frequency power supply unit 11, applies ultrasonics to a liquid in the indirect vessel 14 through the diaphragm 12, and further applies ultrasonics to a cleaning liquid in the cleaning vessel 4.

Figure 10:
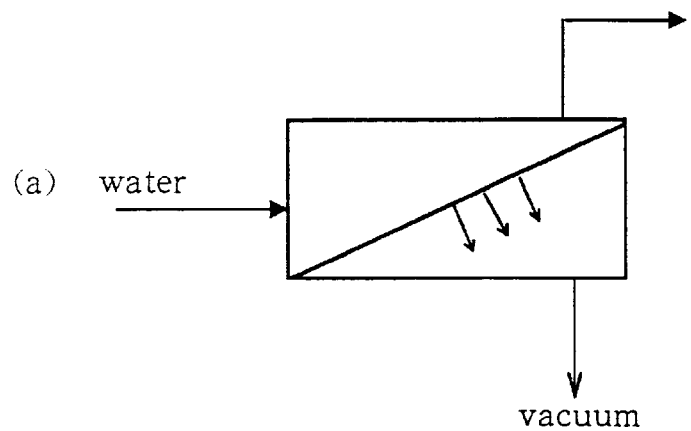
Figure 10:
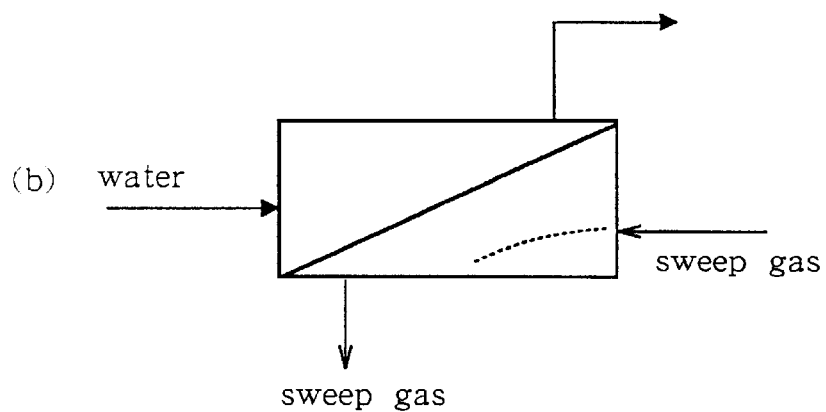
Figure 10:
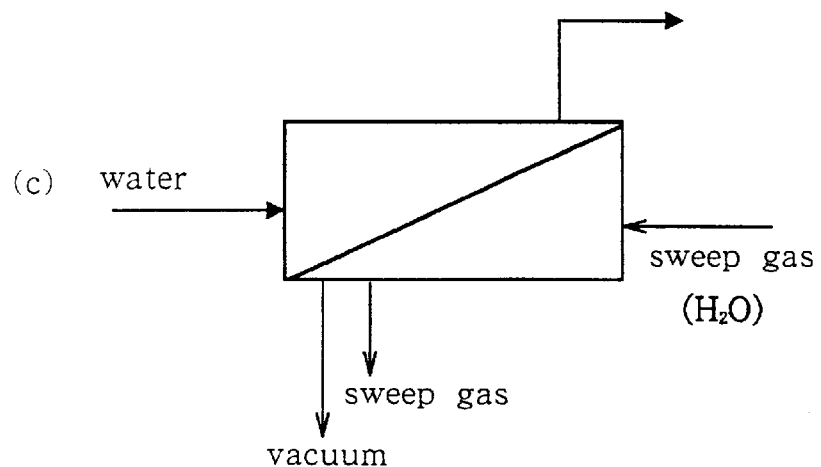

Stored in the cleaning vessel 4 is a cleaning liquid which is circulated back to the cleaning vessel by a pump 1 through a filter 2 and a degassing device 3. Degassing of the cleaning liquid is executed in the degassing device 3. FIG. 10 shows details of the degassing device.

On the other hand, the liquid in the indirect vessel 14 is circulated back to the indirect vessel 14 by a pump 8 through a filter 7 and a degassing device 5.

The two-vessel type of cleaning apparatus described above is mainly used for high-temperature cleaning, and the liquid in the indirect vessel 14 provides the cooling action therefor.

In the two-vessel type of cleaning apparatus described above, not only the liquid in the cleaning vessel 4 but also that in the indirect vessel 14 are degassed.

The one-vessel type of cleaning apparatus shown in FIG. 5 is used mainly for cleaning under the room-temperature. This construction is one obtained by removing the indirect vessel 14 and the peripheral devices accompanying the vessel 14 each from the two-vessel type of cleaning apparatus shown in FIG. 2, and the others are the same as those in the two-vessel type of cleaning apparatus shown in FIG. 4.

It should be noted that, in the cleaning apparatus, by contacting the cleaning liquid in the cleaning vessel and the liquid in the indirect vessel with air, not only oxygen but also nitrogen are dissolved in the cleaning liquid or a liquid. For this reason, it is preferable to employ a sealing system in which the contact of the liquid with air is cut off by a cover or the like provided therein.

(Degassing device)

The degassing devices shown in FIG. 4 and FIG. 5 is required to be able to remove not only the dissolved oxygen but also all the dissolved gas from the liquid.

The degassing device having the construction shown in FIG. 10 is generally known.

The device shown in FIG. 10 (a)is one for simply increasing the degree of vacuum in the side of a gaseous phase and promoting movement of the gas dissolved in the liquid phase to the side of the gaseous phase through the degassing film.

The device shown in FIG. 10 (b)is one for reducing pressure while flows gas called sweep gas in the side of the gaseous phase and promotes movement of the dissolved gas.

The device shown in FIG. 10 (c) is one having construction obtained by combining the device in FIG. 10 (a)with that in FIG. 10 (b)for producing a vacuum as well as flowing sweep gas therein.

When sweep gas is flown therein, degassing is remarkably promoted.

In the case of the device shown in FIG. 10 (a), there is limitation in a removal ratio of dissolved gas, and on the other hand, in a case where a depressuring method using sweep gas and a depressuring film is applied to removal of all the dissolved gas, the fundamental problem is that it is impossible to present the sweep gas elements from dissolving or remaining in the liquid phase. There came up the idea to the inventor that the problem will possibly be solved by using, as sweep gas, a gas which may be dissolved but does not remain as "dissolved gas". Then, there came up another idea that water vapor with high purity may be used as sweep gas. Namely even if water vapor is contaminated in the cleaning liquid as gas, it is changed to water, which indicates that the vapor is not changed to impurity gas in the cleaning liquid. The purity may be made to a desired one as necessity, and in the case of water vapor, it is easy to obtain high-purity aqueous vapor. If water vapor having purity of 2 to 5 ppb is used as sweep gas, for example, it is also easy to change the gas rate dissolved in the cleaning liquid to a level of 10 ppb. Also, it is possible to control a gas rate dissolved in the cleaning liquid by changing a density of the impurity (e.g. oxygen, nitrogen) in the water vapor and a flow rate thereof.

It is indispensable for carrying out the present invention to produce high-purity gas not containing gas other than water vapor and send it to the depressurizing degassing-film module also using sweep gas. As a means for executing the steps described above, there may be employed a method of mixing high-purity hydrogen and high-purity oxygen with each other at a molecular weight ratio of 2:1 and promoting the reaction for composing water ($2H_2+O_2 \rightarrow 2H_2O$) by oxidation of hydrogen with the help of a catalyst (e.g. Japanese Patent Laid- Open Publication No. 115903/1994). It is possible to prepare water actually containing no dissolved gas therein (a density of all gas dissolved in the liquid is 10 ppb or less) by introducing the high-purity water vapor produced as described above into the film degassing module in the same method as the ordinary method in which nitrogen or the like is used as sweep gas. When this water is used in the form of water vapor as sweep gas, whereby high-purity sweep gas is obtained.

EMBODIMENTS

Description is made hereinafter for Embodiments of the present invention.

(Embodiment 1)

In the embodiment, a study was made on a relation among a megasonic frequency, a dissolved gas density, and sound pressure which is an indicator of the propagation of a megasonic wave.

Ultrapure water is poured into a sealed type of quartz vessel with a capacity of 5 litters and protected from the air at a flow rate of 1.2 L/min, and megasonics are irradiated thereonto at a power density of 3.2 W/cm$^2$.

Figure 1:
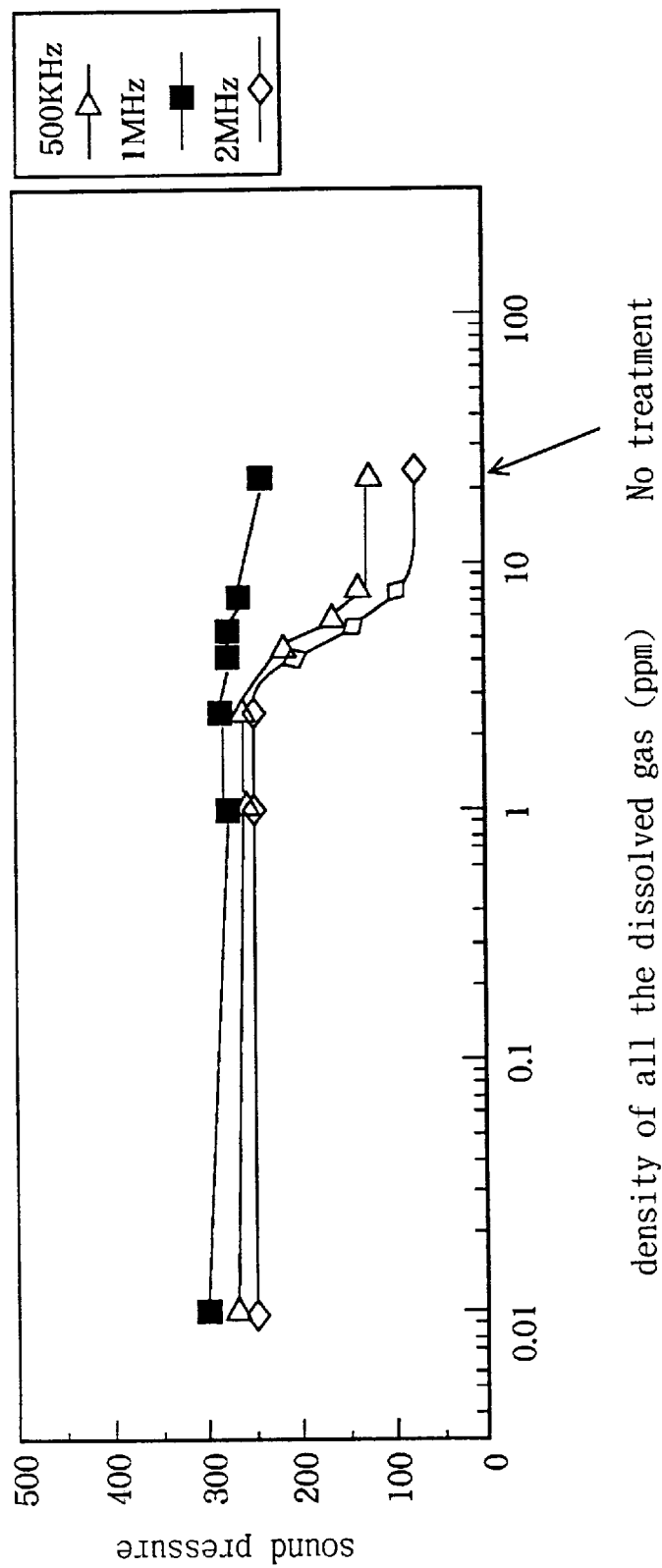
FIG. 1 is a graph showing a relation among a megasonic frequency, a dissolved gas density, and sound pressure according to Embodiment 1.

FIG. 1 shows a result of experiments carried out by using megasonics with frequencies of 1 MHz and 2 MHz. Indicated in the horizontal axis is a density of all the dissolved gas and in the vertical axis is a value of sound pressure which is conceivable as an indicator of the megasonics propagation respectively. The ultrapure water as row water is not degassed at all, and gas is dissolved therein up to the saturated density by air. In a case where degassing is not subjected thereto at all, a density of dissolved oxygen is 8 to 9 ppm, a density of dissolved nitrogen is 14 to 15 ppm, namely the density of all of the dissolved gas is more or less 24 ppm. Even in a case where a vary large amount of gas was dissolved in the liquid as described above, the sound pressure having a value close to that in a case where highly degassing was subjected to the liquid was shown when megasonics with a frequency of 1 MHz is irradiated thereonto.

On the other hand, in the cases of 1 MHz and 2 MHz, there was found an obvious tendency that a higher density of the dissolved gas made the sound pressure lower in an area having the density higher than that of the dissolved gas of 3 to 5 ppm. Even if degassing was subjected to the liquid so that the density would be lowered to around 3 to 5 ppm or below, no remarkable difference was found in the sound pressure.

From the data, it was possible to expect that, if degassing was subjected to the liquid so that the density of all the dissolved gas is lowered to 5 ppm or below, excellent effects could be obtained in a case where megasonics with a frequency of 1 MHz or 2 MHz is used. Especially, the density of 3 ppm or less is preferable because the highest effects can be obtained.

(Embodiment 2)

In this embodiment, a study was made on a relation among a megasonic frequency, a dissolved gas density, and a removal capability of particulate from a substrate.

Figure 2:
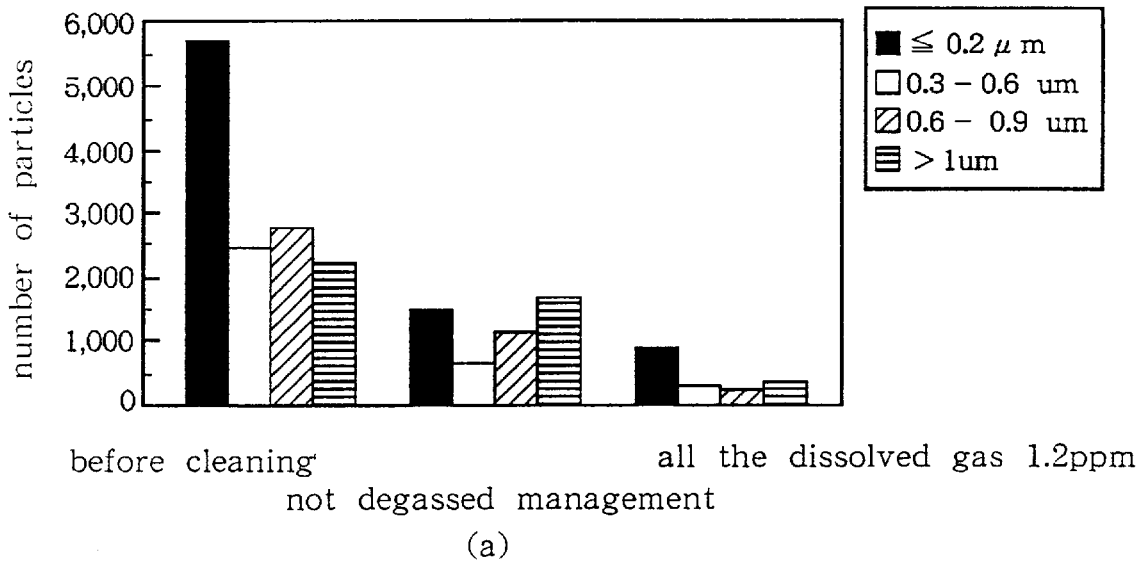
FIG. 2 is graphs each showing a relation among a megasonic frequency, a dissolved gas density, and removal capability of particulate from a substrate according to Embodiment 2; wherein FIG. 2a the ultrasonic frequency is 1 MHz and FIG. 2b, the ultrasonic frequency is 2 MHz.
Figure 2:
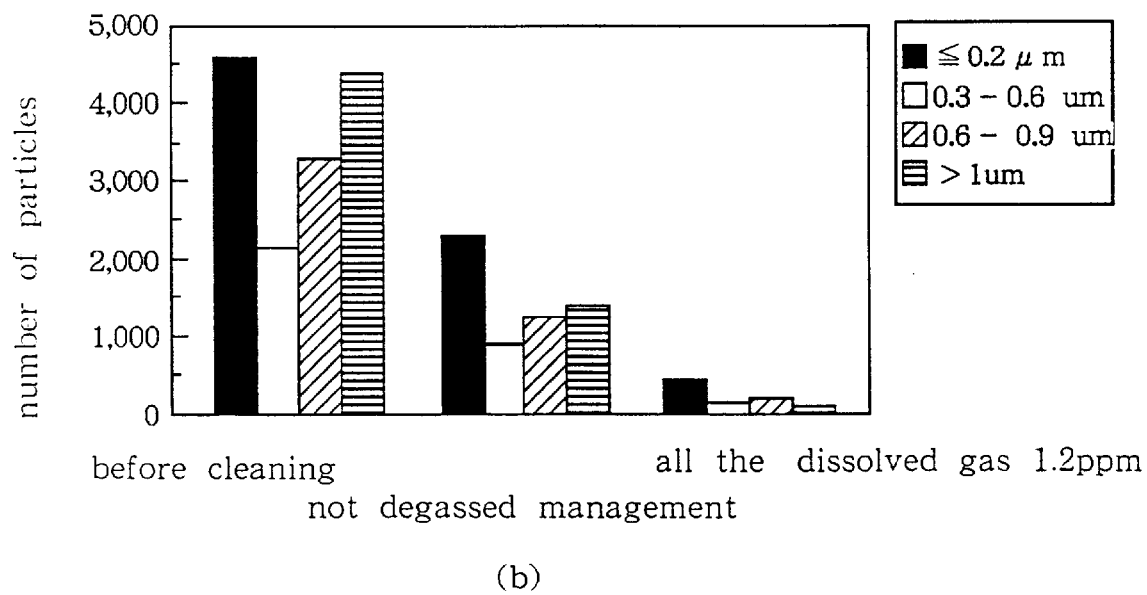

At first, a silicone wafer substrate having an 8-inch diameter forming an Al pattern with a distance between lines of 0.5 μm was immersed in a liquid in which alumina particulate was dispersed to forcefully adhere the particulate onto the substrate. The substrate was immersed in a cleaning liquid which was not degassed like in the conventional method (ultrapure water containing a surface-active agent therein) and in a cleaning liquid in which all the dissolved gas was reduced to 1.2 ppm, and then megasonics having a power density of 3.2 W/cm$^2$ was irradiated thereonto for 10 minutes. FIG. 2 (1) and (2) show results of experiments in a case where megasonics is applied to removal of particulate from the silicone substrate. Also, removal rates of particulate are summarized in the table described below.

TABLE 1

|  | Not degassed | Degassed to 1.2 ppm |
| --- | --- | --- |
| 500 kHz | 68% | 70% |
| 1 MHz | 62% | 87% |
| 1 MHz | 59% | 90% |

It was found from the above values that the removal rate of particulate with megasonics with a frequency of 1 MHz is higher when degassing is not executed to the liquid, while the removal rate of particulate with megasonics with a frequency of 2 MHz is higher when degassing is executed thereto as far as 1.2 ppm, especially, alumina particulate which is especially difficult to be removed from a silicone substrate can be removed with high efficiency of 90% or more with a combination of megasonics with a frequency of 2MHz and the degassed liquid as well as with an extremely simple cleaning liquid containing only ultrapure water and a surface-active agent therein.

Further, lack of uniformity in cleaning was not found, and hardly found unevenness of uniformity in cleaning on the wafer.

Figure 6:
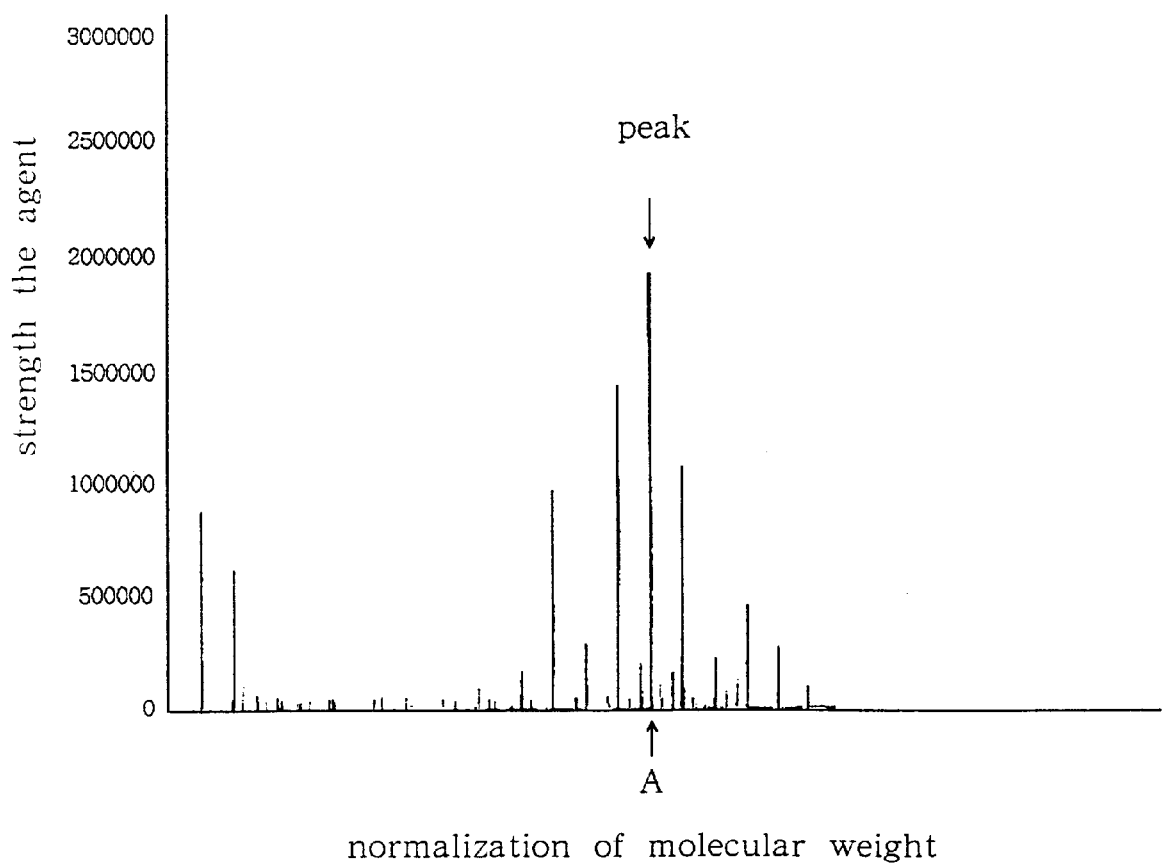
FIG. 6 is a graph showing the molecular weight distribution of a surface-active agent before cleaning is carried out.

Also a study was made on the surface-active agent. FIG. 6 shows a result of analysis of the surface-active agent before cleaning was carried out. In FIG. 6, the X-axis indicates values obtained by normalization of molecular weights, while the Y-axis indicates strength of the agent. The peak of the strength appears at position A.

Figure 7:
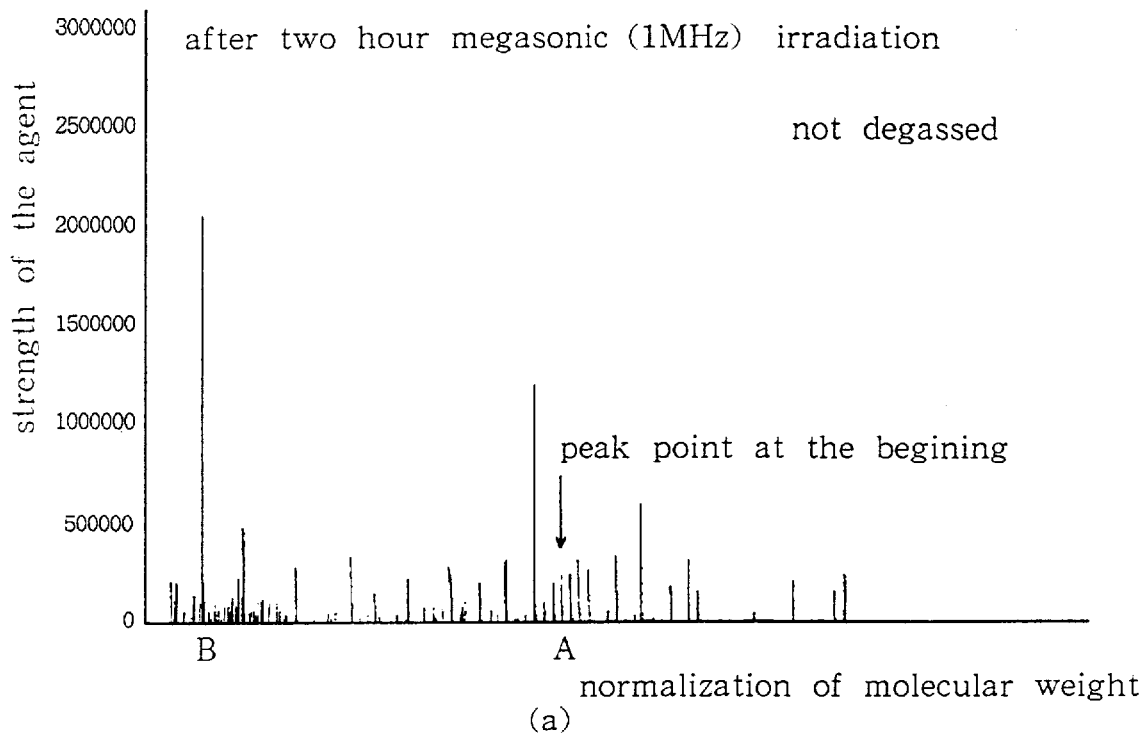
Figure 7:
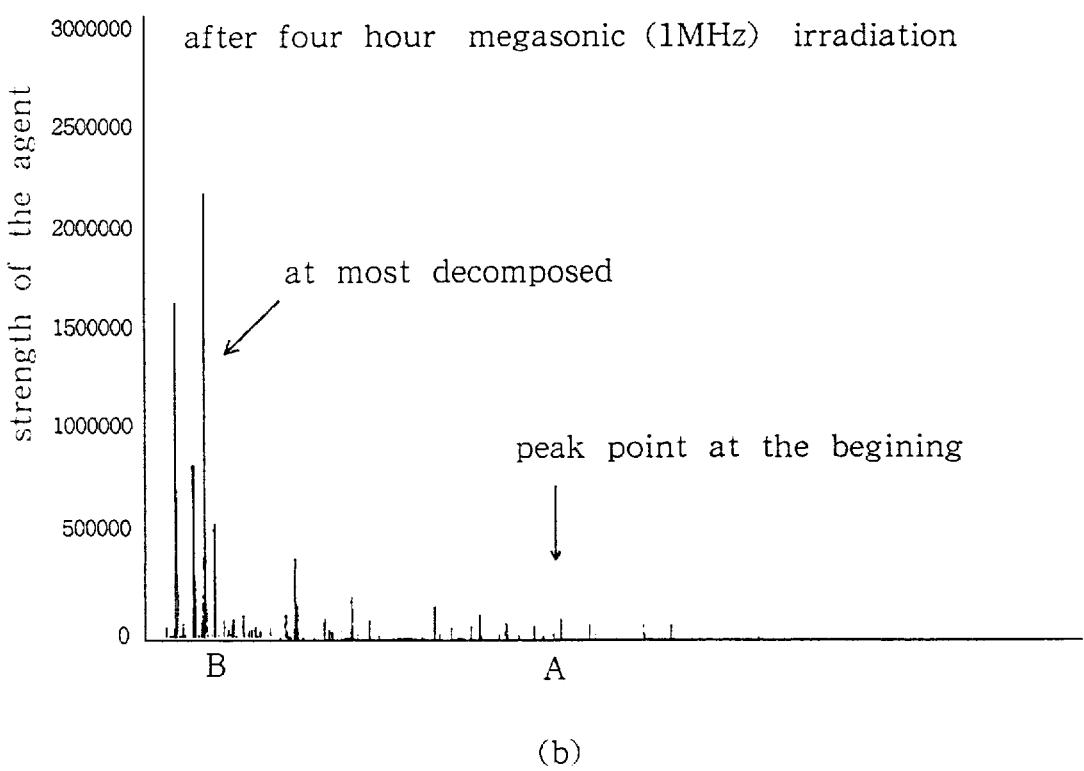

On the other hand, FIG. 7 shows a result of analysis of the surface-active agent after the cleaning is carried out in a case where degassing is not executed to the liquid, and it is understood from this study that the peak thereof moves to the position B after two hours have passed from the peak after the cleaning, and after four hours have passed, the peak value further increases. That indicates the fact that the surface-active agent is decomposed after two hours have passed.

Figure 8:
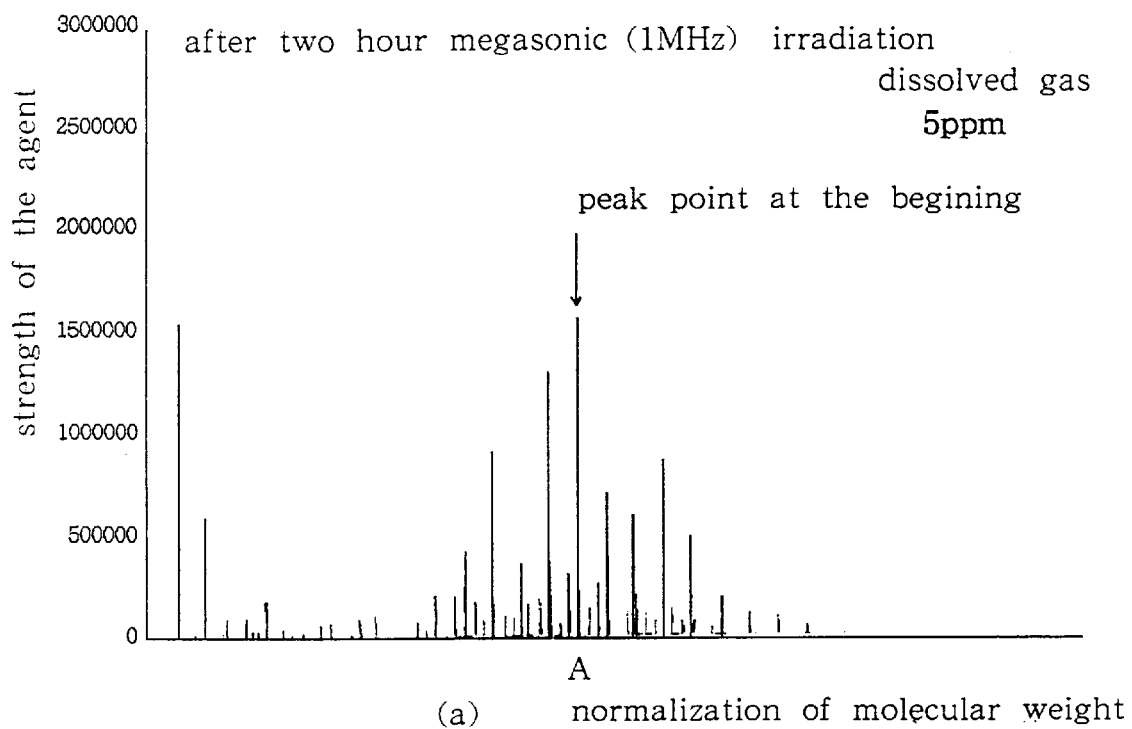
Figure 8:
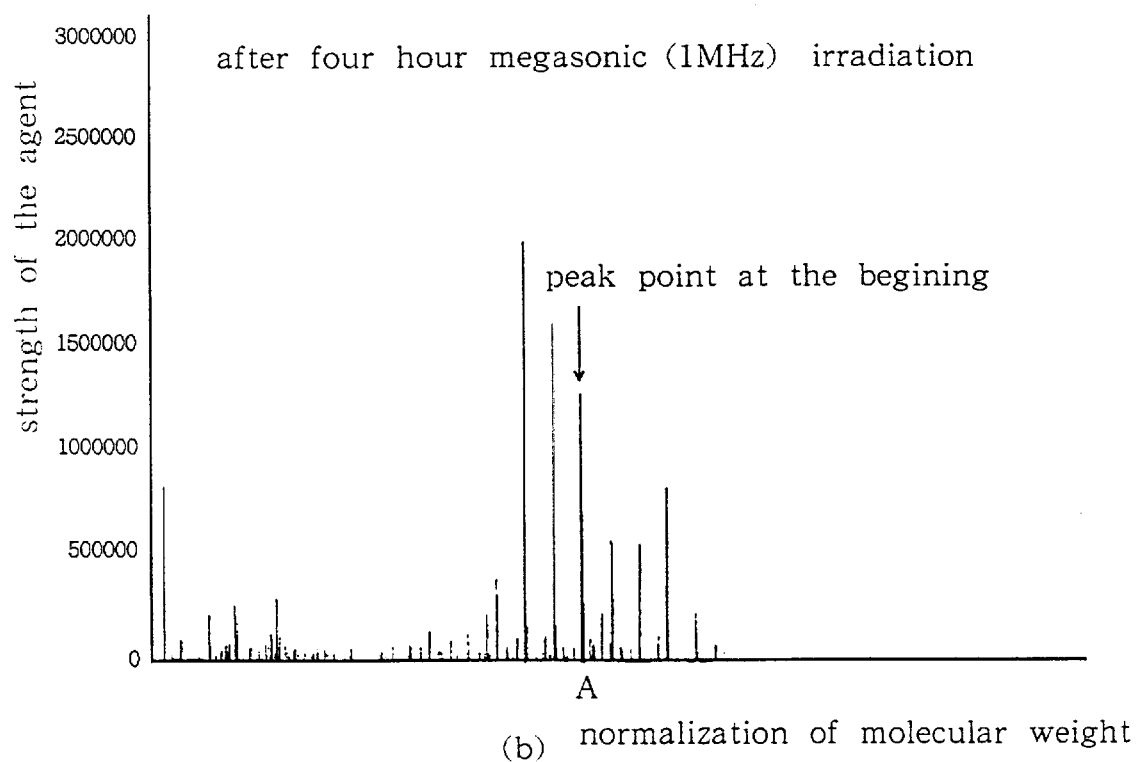
Figure 9:
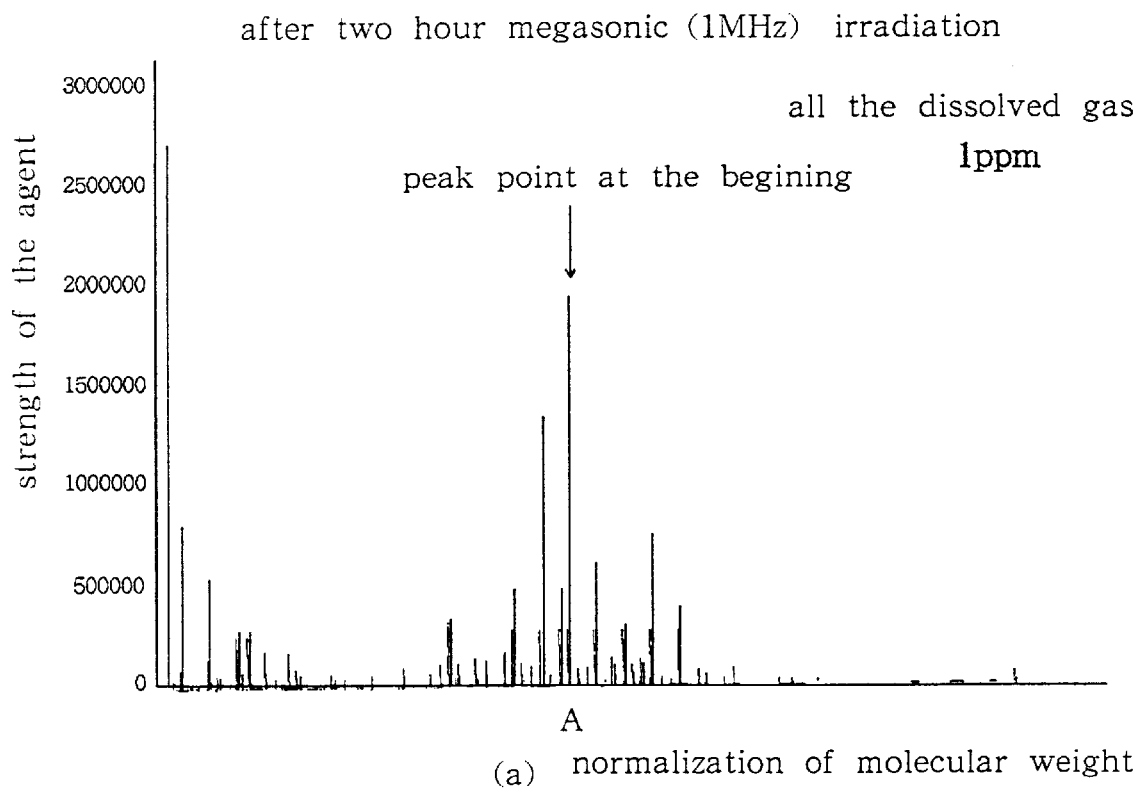
Figure 9:
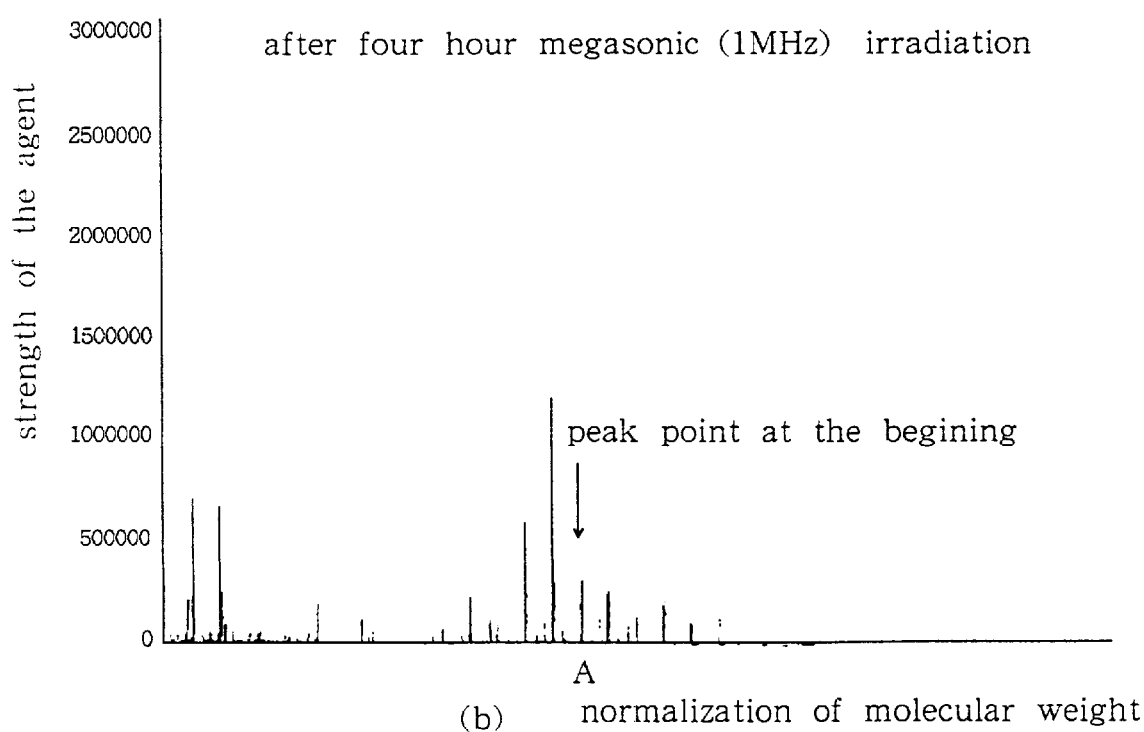

In contrast, FIG. 8 shows a case where the liquid is degassed to 5 ppm, and FIG. 9 shows a case where the liquid is degassed to 1 ppm, and movement of the peak position is hardly found in any cases, yet even if found, it is only a slight amount, and in a case where degassing is executed thereto, the surface-active agent is remained therein without being decomposed, accordingly, it is possible to perform stable cleaning even in association with elapse of time.

(Embodiment 3)

In the embodiment, a study was made on a relation among a megasonic frequency, a dissolved gas density, a distance between substrates, and propagation of a sound wave (sound pressure) between the substrate.

Figure 3:
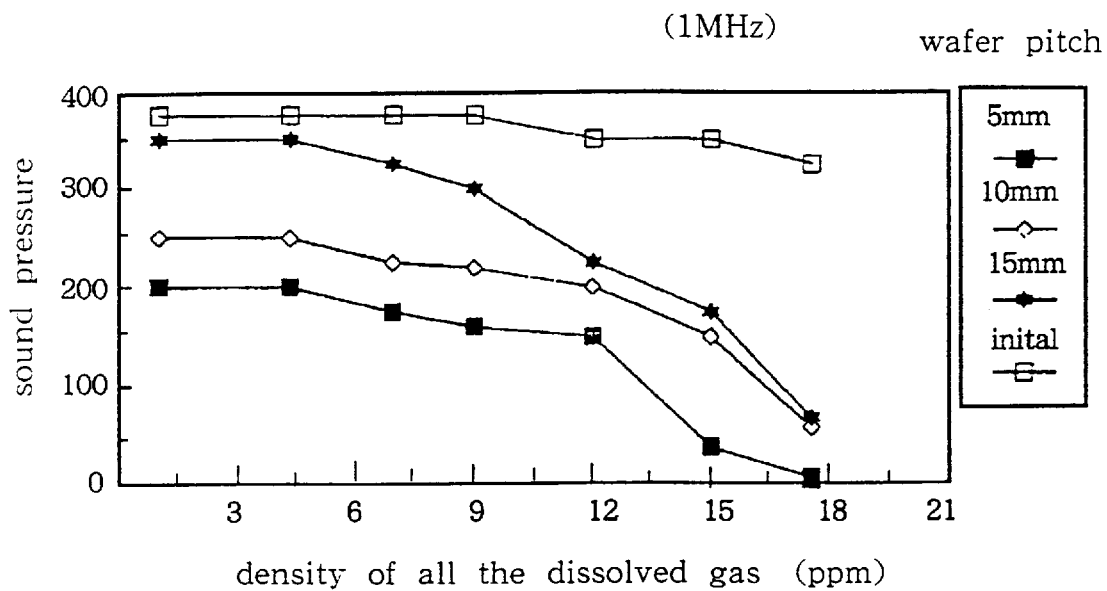
FIG. 3 is graphs each showing a relation among a megasonic frequency, a dissolved gas density, a distance between substrates, and sound pressure between the substrates according to Embodiment 3; wherein FIG. 3a, the megasonic frequency is 1 MHz and FIG. 3b, the megasonic frequency is 2 MHz.
Figure 3:
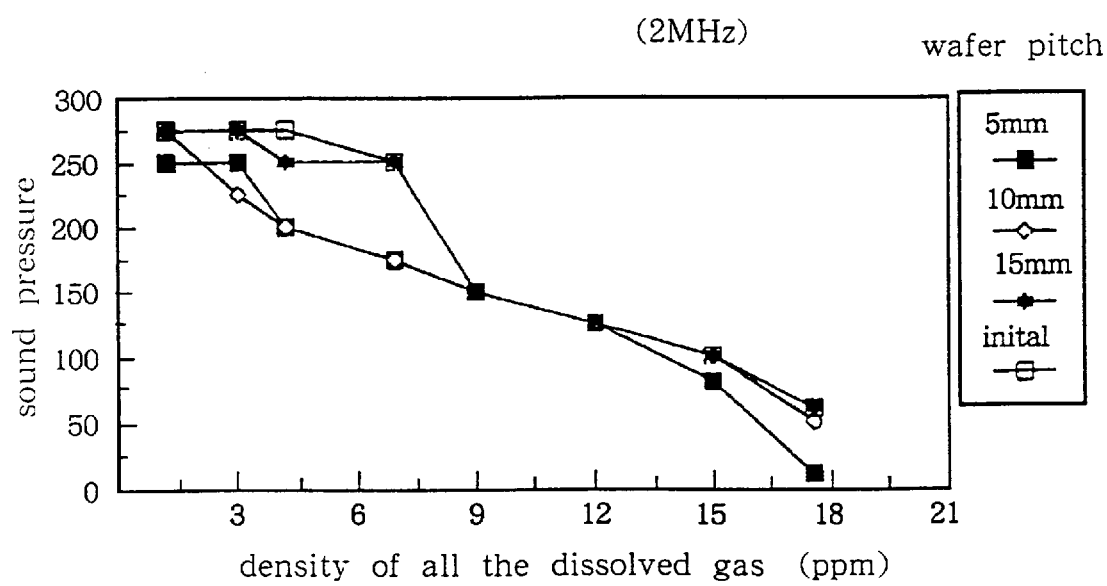

FIG. 3 shows a result obtained by setting some pieces of 6-inch silicone substrate on a wafer carrier with a different distance therebetween, and estimating a degree of passage of a megasonic wave therethrough with measurement of the sound pressure. In this experiment, ultrapure water in which the density of all the dissolved gas was reduced to 1.2 ppm was used.

In the case of 1 MHz, the sound pressure passing through the substrates largely depended on the distance between the substrates, and when the distance was narrowed to 5 mm, the sound pressure was reduced to around 60% out of the value obtained when there were no substrates. On the other hand, in the case where megasonics with a frequency of 2 MHz was applied thereto, the sound pressure passing through the substrates depended not much on the distance between the substrates, and even when the distance therebetween was 5 mm, the sound pressure shows around 80% or more out of the value obtained when there were no substrates. That indicates the fact that a higher frequency makes a sound wave easily enter even a narrow spot.

It is clearly understood from the results of those three experiments that, when a high-frequency megasonics degassed to not more than a specified density is used, a sound wave can sufficiently enter any spots even in the case of a narrow distance between substrates, whereby excellent effects over removal of particulate therefrom can be achieved.

INDUSTRIAL APPLICABILITY

With the present invention the effects described below are achieved.

(Claim 1)

(1) Generation of bubbles are completely suppressed, whereby the propagation efficiency of a sound wave is enhanced.

(2) It is possible to obtain excellent effects over removal of particulate therefrom, which can not be obtained with megasonics of around 1 MHz.

(3) It is possible to narrow a distance between substrates which are objects for cleaning, whereby it is possible to increase a processing rate in batch cleaning.

(Claim 3)

Decomposition of a surface-active agent is suppressed, whereby it is possible to obtain with stability high cleaning efficiency in association with elapse of time.

We claim:

1. A method of cleaning semiconductors, comprising the steps of:
    degassing gas dissolved in a cleaning liquid therefrom to a value not more than 5 ppm;
    loading ultrasonics with a frequency of 1 MHz or more to said cleaning liquid; and
    cleaning the semiconductors with said cleaning liquid.

2. A method of cleaning semiconductors, comprising the steps of:
    degassing gas dissolved in a cleaning liquid therefrom to a value not more that 3 ppm;
    loading ultrasonics with a frequency of 2 MHz or more to said cleaning liquid; and
    cleaning the semiconductors with said cleaning liquid.

3. A method of cleaning semiconductors, comprising the steps of:
    degassing gas dissolved in a surface-active agent containing cleaning liquid therefrom to a value not more that 5 ppm;
    loading ultrasonics with a frequency of 1 MHz or more to said cleaning liquid; and
    cleaning the semiconductors with said cleaning liquid.

4. A method of cleaning semiconductors, comprising the steps of:
    degassing gas dissolved in a surface-active agent containing cleaning liquid therefrom to a value not more that 3 ppm;
    loading ultrasonics with a frequency of 2 MHz or more to said cleaning liquid; and
    cleaning the semiconductors with said cleaning liquid.

* * * * *